United States Patent [19]

Thumm

[11] 4,202,227
[45] May 13, 1980

[54] MULTIPLE POSITION TOOL HOLDER

[75] Inventor: Helmut Thumm, Metzingen, Fed. Rep. of Germany

[73] Assignee: Sauter Feinmechanik GmbH, Fed. Rep. of Germany

[21] Appl. No.: 942,185

[22] Filed: Sep. 14, 1978

[30] Foreign Application Priority Data

Sep. 17, 1977 [DE] Fed. Rep. of Germany ....... 2741907

[51] Int. Cl.$^2$ ............................................. B23B 29/28
[52] U.S. Cl. .................................. 82/36 A; 74/813 L; 74/826
[58] Field of Search .............. 83/36 A; 74/813 L, 826

[56] References Cited

U.S. PATENT DOCUMENTS

| 3,222,955 | 12/1965 | Ross et al. ............. | 82/36 A |
| 3,760,655 | 9/1973 | Buchmeier ............. | 82/36 A |
| 4,038,891 | 8/1977 | Zaninelli ............. | 82/36 A |
| 4,151,759 | 5/1979 | Buchmeier ............. | 74/826 |

FOREIGN PATENT DOCUMENTS 1232637  5/1971  United Kingdom ................. 74/826

Primary Examiner—Leonidas Vlachos
Attorney, Agent, or Firm—Roylance, Abrams, Berdo & Farley

[57] ABSTRACT

A cylindrical tool holder is mounted on a a housing containing a motor, the output shaft of which is coupled through a gear train to a driving ring. One axial face of the driving ring has cam surfaces engageable with cooperating cam surfaces on an axial face of an axially movable locking ring which is spring-urged toward the driving ring. The other axial face of the locking ring has axially facing gear-like teeth which are engageable with mating teeth on a flange formed on the housing and on a ring attached to the tool holder. A lock bolt mounted in the housing and operated by an electromagnet is withdrawn from a ring coupled to the tool holder to permit rotation to a new position and is extended to lock the holder near the new position.

4 Claims, 5 Drawing Figures

MULTIPLE POSITION TOOL HOLDER

This invention relates to a multiple tool holder for machine tools, especially for turning machines, including means for repositioning a tool carrier and for locking the carrier in its new position.

BACKGROUND OF THE INVENTION

The prior art includes devices for rotatably supporting a multiple tool holder and for rotating the holder to bring a desired tool into position adjacent a workpiece so that a machining operation can take place. One such prior art device is shown in German Auslegeschrift No. 1,293,526, wherein a generally cylindrical fixed portion of the apparatus contains an electric motor, the rotatable portion of the motor being coupled to a rotatable portion of the tool holder. This device includes a stop arrangement for preventing rotation between the fixed portion and the tool carrier whenever the motor is driven in the reverse rotational direction in order to achieve an axial movement establishing connection between driving teeth between the rotatable portion and a fixed part, the axial motion being established by axial cam surfaces. However, in this apparatus it has been found to be a significant disadvantage that when the carrier is rotated from the stop arrangement, it must travel over various stop positions. This permits only the use of weak springs which has the disadvantage of an uncertain stop support of the part to be latched by the stop arrangement.

In German Offenlegungsschrift No. 1,477,829, a manually shiftable multiple tool holder is shown wherein a locking member is axially movable.

BRIEF DESCRIPTION OF THE INVENTION

An object of the present invention is to create a connecting arrangement switchable in conjunction with the driving motor for establishing a secure, although imprecise, latch relationship between the tool carrier and a locally fixed part of the apparatus which can be followed by a fine subsequent adjustment by means of a front-toothed arrangement.

A further object is to provide such an apparatus in which the connecting arrangement is in the form of a locking arrangement with a slidable bolt, movable axially with respect to its own axis, which can be controlled together with the driving motor and which establishes a connection against rotation between the fixed portion of the apparatus and the movable tool carrier prior to the positioning of the carrier by the front-toothed arrangement. The connecting arrangement switchable with the drive motor makes possible a safe connection between the locally fixed lower or mounting portion of the apparatus and the rotatable tool carrier whenever the driving motor changes its speed or direction. This connection serves for the rough adjustment between the tool carrier and the locally fixed part which can be subsequently improved by a fine adjustment determined by the front toothing so that it is possible to release the locally fixed part in the tool carrier by a corresponding switching impulse.

In a preferred embodiment with a tool carrier disposed transversely to the axis of rotation and a bolt slidable counter to the action of a spring, the bolt is connected through a pivotable lever moved by the core of an electromagnet having an energizing winding.

A quick axial connection of the front toothing and a position of the axial cams, in which only slightly reversing forces occur in the peripheral direction, is achieved through the fact that the cam surfaces of the slanting planes of the axial cams are developed with two distinct inclinations wherein the cam surface adjacent to the counter cams is flatter than the cam surface removed therefrom and in that a recess for the reception of counter cam follows the driving shoulder, as viewed in the peripheral direction.

Briefly described, the invention includes a positionable tool holder for supporting a plurality of tools and means for selectively repositioning the tool holder for use in combination with a turning machine, comprising the combination of a fixed mounting member, a tool carrier rotatable about a fixed axis relative to the mounting member, means for releasably interconnecting the carrier and the mounting member, the means including a plurality of teeth on the tool carrier, and a toothed locking ring axially movable between a locking position in which the teeth on the ring engage the teeth on the carrier and an unlocked position in which the teeth are disengaged, an actuating member mounted for engagement with the locking ring, each of the actuating member and the locking ring having axially extending cam surfaces facing each other, the cam surfaces each including an axially sloping plane, an axially recessed seat and a driving shoulder, spring means for urging the cam surfaces of the actuating member and the locking ring into engagement, means for selectively coupling the carrier to the mounting member to prevent rotation thereof, the means including a stop member movable radially relative to the axis, and a reversible rotary drive motor supported on the mounting member, the drive motor and the means for coupling being energizable together.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
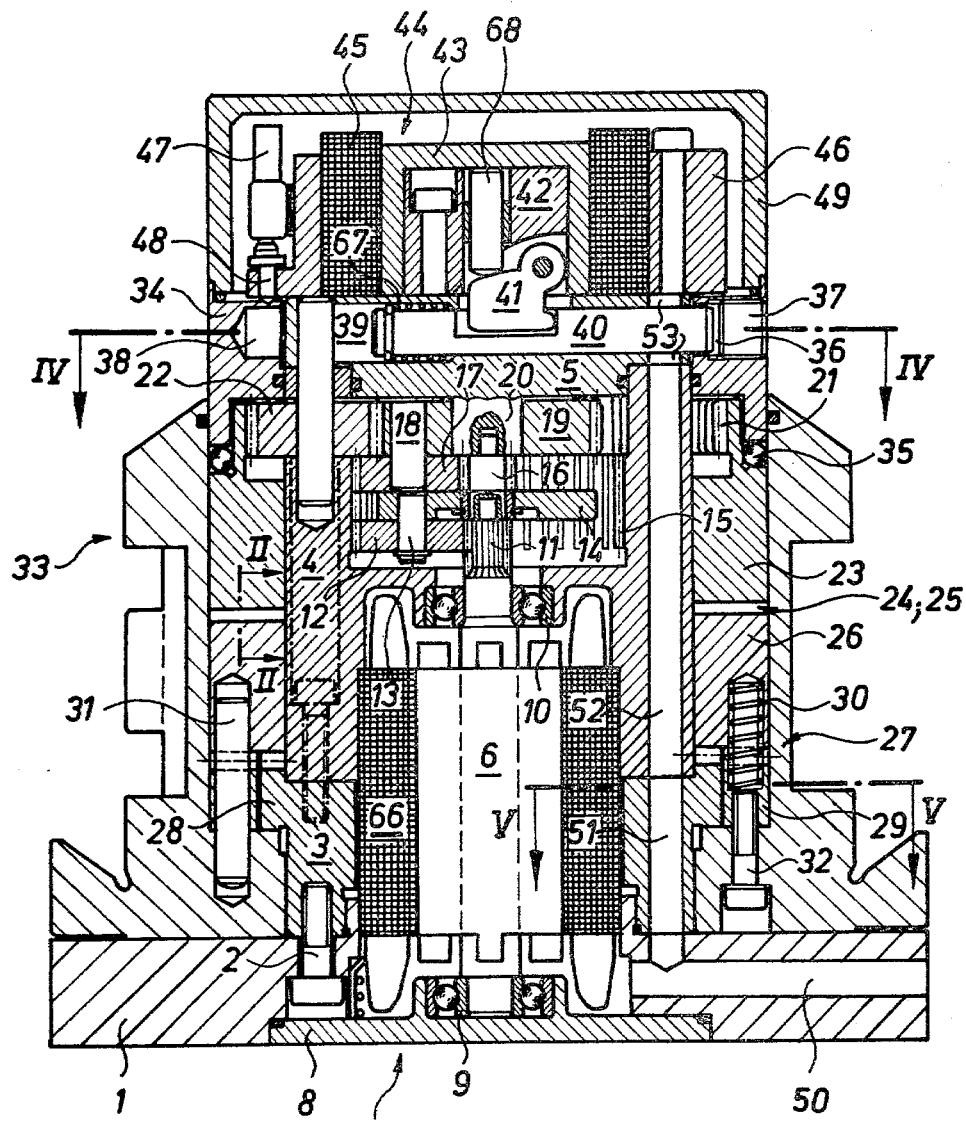
FIG. 1 is a side elevation, in section, of an apparatus in accordance with the invention.

As illustrated, the apparatus includes a base plate 1 which serves for the attachment of the multiple tool holder to a locally fixed portion of the turning machine which is not otherwise illustrated. A hollow cylindrical housing bushing 3 is fixedly attached to the base plate 1 by screws 2, and a hollow cylindrical gear housing 4 is connected to bushing 3. The upper end of housing 4 is covered by a cover plate 5 which is firmly attached to housing 4.

In bushing 3 and in a portion of the gear housing 4 is provided a stator 66 and a rotor 6 of a driving motor indicated generally at 7 which is a rotary motor of the reversible type. Stator 66 and rotor 6 are insertable through an aperture in base plate 1 which is subsequently closed by a bearing plate 6 releasably attached to the base plate 1, the plate 8 supporting a lower bearing 9 for the motor shaft attached to rotor 6. The other bearing 10 for the opposite end of the shaft attached to rotor 6 is mounted in a radially inwardly projecting annular collar of the gear housing 4. A drive shaft of the driving motor 7 which passes through bearing 10 is provided at its distal end with a pinion gear 11 which meshes with a gear 12. Gear 12 is supported on a journaled stub shaft 13 which is mounted in a carrier plate 14. Plate 14 is rotatable about an axis parallel to and coaxial with the axis of pinion 11. Gear 12 also meshes with the teeth of an inwardly facing ring gear 15 which is mounted on, or integrally formed on, the inside of the gear housing 4. Carrier plate 14 is rotatably mounted on a bearing shaft 16, one end of which is rotatably mounted at pinion 11 and the other end of which is mounted in a portion 20 of the cover plate 5 which projects into the gear housing 12. The portion of bearing shaft 16 which protrudes above carrier plate 14 carries a pinion which has not been separately designated and which meshes with a gear 17. The bearing journal shaft of gear 17 is supported in a gear 19 which is disposed coaxially with respect to carrier plate 14 and which is mounted rotatably on the projecting part 20 of cover plate 5. Gear 19 meshes with a gear 22 which engages an inwardly facing ring gear 21. This inside ring gear 21 is attached to a hollow cylindrical driving part 23 which is rotatably mounted on the outside of gear housing 4.

Figure 2:
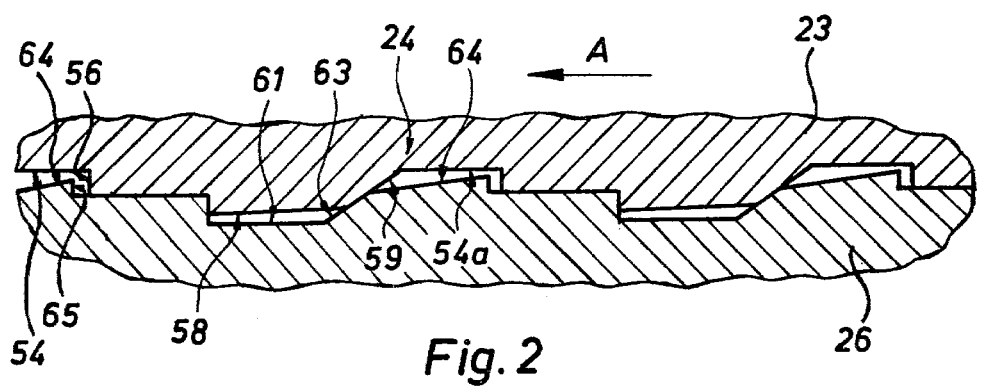
FIG. 2 is an enlarged partial side elevation showing a portion of the apparatus along line II—II of FIG. 1 and showing the cam surfaces thereof in full engagement in an unlocked, position changing condition.
Figure 3:
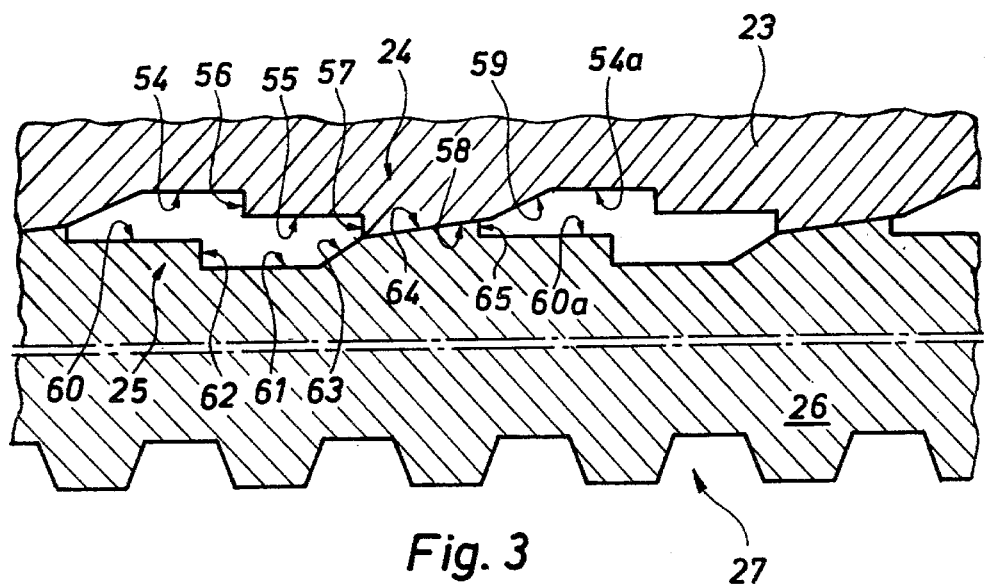
FIG. 3 is an enlarged partial sectional view along lines II—II of FIG. 1 showing the apparatus in a locked condition.
Figure 4:
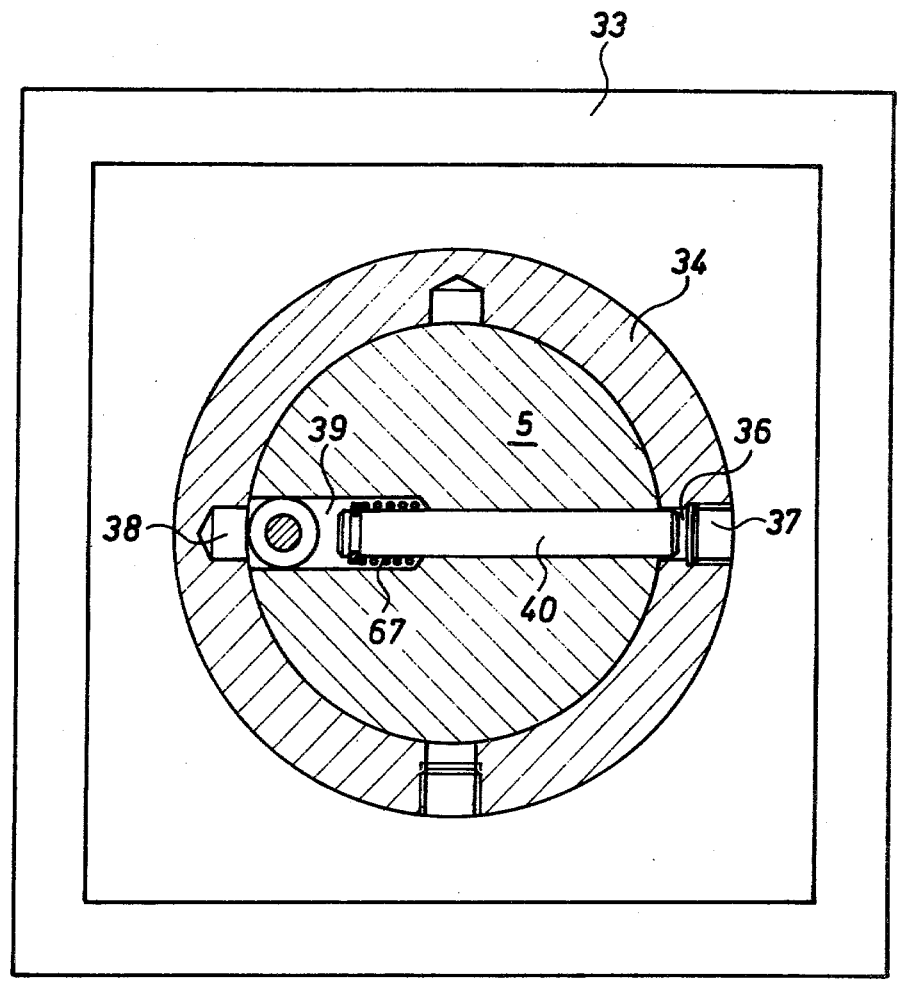
FIGS. 4 and 5 are sectional views along lines IV—IV and V—V of FIG. 1.
Figure 5:
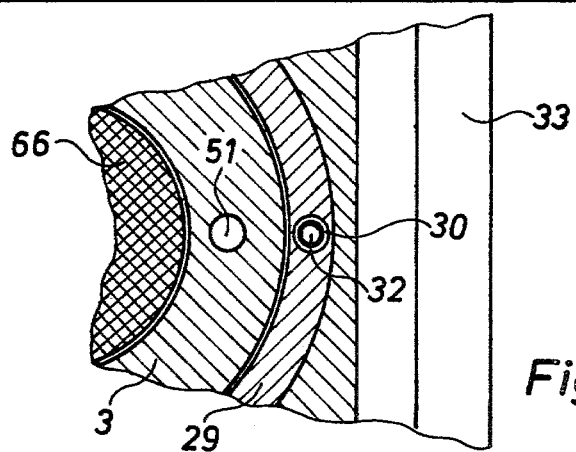

As shown in FIGS. 2 and 3, the driving ring 23 is provided on its axial end facing base plate 1, opposite from the end having ring gear 21, with means defining axial cams 24 which cooperate with similar axial cams 25 on a locking ring 26 which is in the form of a hollow cylinder or annulus and which is disposed coaxially with respect to driving portion 23. In the region of axial cams 24 and 25, the components 23 and 26 have equal inside and outside diameters. Locking ring 26 is rotatably mounted and is also shiftable in an axial direction, with respect to the central axis of the motor, and, at the end facing away from the axial cams, ring 26 is provided with a plurality of axially extending teeth which are referred to as front toothing 27.

The housing bushing 3 has a radially outwardly protruding annular flange 28 which carries a front toothing corresponding to front toothing 27 and cooperating with it on the side thereof facing locking ring 26. The flange-like part 28 is enclosed by a gear or tooth ring 29 which lies radially outwardly of flange 28 and, on that surface which faces toward locking ring 26, is provided with teeth which correspond to, and are capable of meshing with, the front toothing 27 of ring 26. The toothed ring 29 is rotatable with respect to flange 28. It will be observed that the radial thickness of locking ring 26 corresponds to the sum of the thicknesses of flange 28 and ring 29. Thus, when ring 26 is in its lowest position, as viewed in FIG. 1, the teeth at the bottom surface thereof engage teeth on both flange 28 and ring 29, preventing relative movement therebetween. Between the toothed ring 29 and locking ring 26, there is provided one or more springs 30 which spring urges ring 26 upwardly away from toothed ring 29. It will also be observed that the axially movable locking ring 26 is fixed against rotation relative to toothed ring 29 by an axially extending peg 31.

The toothed ring 29 is coupled to tool holder or carrier 33 by means of screws 32 and it will also be observed that peg 31 penetrates toothed ring 29 and engages the tool carrier 33. The tool carrier 33 is in the form of a hollow cylinder and encloses the driving ring 23, locking ring 26 and the intermediate toothed ring 29 as well as the housing bushing 3, and the carrier rests on base plate 1.

The cover plate 5 is enclosed by an interlocking ring 34 from which a projecting edge engages with the tool carrier 33, ring 34 being axially supported on driving part 23 by means of a row of balls 35. The row of balls 35 rests, in this embodiment, on a shoulder of driving ring 23. Balls 35 are enclosed by driving part 23, tool holder 33 and locking ring 34. The locking ring 34 is fixedly connected to the tool holder 33 to prevent relative rotation therebetween.

Locking ring 34 is provided with a plurality of radial holes 36 distributed around the periphery of the ring, the annular positions thereof corresponding to the various positions to which the tool carrier 33 is to be moved, this being a function of tool position thereon. Holes 36 open to the outside, but are closed by screw plugs 37, the other ends of the holes being a blind bore 38 located on the opposite side of the locking ring. In a radial bore 39 of cover plate 5, is a bolt 40 which is shiftable axially with respect to its own axis, or diametrically with respect to the central axis of the apparatus, but in any event in its longitudinal direction. Between the ends of bolt 40 is a retaining ring and a projecting collar in the bore 39 with a spring 67 clamped therebetween, the spring tending to urge the bolt 40 into the position in which it is drawn entirely into the bore 39. The holes 36 and the blind bore 38 are dimensioned and intended for engagement by the end of bolt 40 which is distant from the spring and which, in the position illustrated in FIG. 1, engages in hole 36.

An operating lever 41 engages a lateral recess in bolt 40, the lever being pivotably mounted in a housing part 42 connected with cover plate 5. The housing part 42 also serves for the mounting of an adjusting bolt 68 which acts upon lever 41, bolt 68 being axially shiftable and disposed coaxially with respect to pinion 11, the bolt being enclosed by an axially shiftable core 43 of an electromagnet indicated generally at 44. The core 43 lies within, and is movable relative to, energizing winding 45 of the electromagnet. It will be observed that electromagnet 44 is also disposed coaxially relative to pinion 11 and is enclosed by a housing ring 46 which is fixedly attached to cover plate 5 and which carries a switch 47, the actuating member of which can be operated by a switching pin 48. The switching pin is mounted shiftably in the housing ring 46 with its axis parallel to the housing, and the pin cooperates with at least one axial recess on locking ring 34. As many switches 47 and axial recesses are provided as are necessary for the operation of this multiple tool holder, the switches and the recesses assigned to them being arrangeable on various diameters.

Electromagnet 44 and the one or several switches 47 are enclosed by a hood 49 which is fixedly attached to locking ring 34.

Base plate 1, housing bushing 3, gear housing 4 and cover plate 5 are all provided with bores 50–53 which extend through these elements and meet with each other to provide a continuous passage for the penetration of insulated electric wires.

The precise development of the axial cams is shown in FIGS. 2 and 3. Axial cam 24 has two flat surfaces 54 and 55 which are axially spaced from each other and which lies in planes perpendicular to the central axis of driving ring 23. These surfaces are separated by a shoulder 56 which protrudes from surface 54. A shoulder 57 protrudes from flat surface 55 and is disposed between surface 55 and an inclined planar surface 58 which joins a further inclined planar surface 59 on the side of a cam tooth facing away from shoulder 57. The two inclined planes 58 and 59 form an obtuse angle wherein the inclined plane 59 enclosed a more acute angle with respect to a line parallel to the axis of the driving part 23 than does the inclined plate 58. A flat surface 54a corresponding to the flat surface 54 follows the inclined plate 59.

The axial cams 25 of the locking part 26 have two flat surfaces 60 and 61 between which a shoulder 62 is located, wherein the plane 60 is substantially parallel with plane 61 and shoulder 62 protrudes from plane 61. An inclined plane 63 follows surface 61, which inclined plane extends into an inclined plane 64, the inclinations of planes 59 and 63 on the one hand, and of the inclined planes 58 and 64 on the other hand, are formed substantially identically. Between the inclined plane 64 and the following flat surface 60a, which corresponds to flat surface 60, lies a shoulder 65.

FIG. 2 shows a position of elements 23 and 26 wherein the driving part 23 drives the locking part 26 rotationally so that the tool holder 33 is swiveled. In that condition, the shoulder 57 and 62 and the inclined planes 59 and 63 are in contact with each other, whereas between the flat surfaces 58 and 61 and the flat surface 54 and the inclined plane 64, there are always intervals in an axial direction and between the shoulder 65 and 56 in a peripheral direction.

Surfaces 54 and 59 are repeated on the periphery of driving part 23 and form the axial cams 24. Surfaces 60-65 are repeated on the periphery of locking part 26 and form the axial cam 25. As previously described, the axial cams 24 and 25 are mutually adapted.

In order to rotate the tool holder 33, driving motor 7 is supplied with electric current through a switch, not shown. The gear ratio between pinion 11 and gear 20 amounts to about 1:120. Starting out from the locking position of the axial cams 24 and 25 and of the front toothing 27, shown in FIG. 3, the driving part 23 is turned in the direction of arrow A (FIG. 2), so that the teeth on locking part 26 emerge from the front toothing of the flange-like part 28 and of the toothed ring 29 under the action of spring 30, thereby releasing tool holder 33 for rotational movement. The tool holder is driven as soon as shoulders 57 and 62 of axial cams 24 and 25 fit against each other. In this case, the bolt 40 is drawn into plate 5 so that it is completely extracted from hole 36 in ring 34. The bolt locking connection is released upon energization of the driving motor 7.

Driving part 23 transmits the rotational movement of the driving motor 7 to the tool holder 23 which is then rotated through the desired angle. When tool holder 33 has reached the desired swiveling position, switch 47 is actuated by the switching pin 48 and bolt 40 again fixes the tool holder in its new position in relation to cover plate 5. After that, the driving motor is reversed in its rotational direction so that, as a result of the action of axial cams 24 and 25, the locking part is forced downwardly in the direction toward the toothed ring 29 and the front toothing 27 is brought into full engagement. The terminal position of locking part 26 is reached and the driving motor 7 is turned off when the axial cams 24 and 25 have reached the position shown in FIG. 3. As a result of the variable inclination of inclined planes 58 and 59 on part 23 and of the inclined planes 63 and 64 on locking parts 26, there is first achieved a quick engagement of the front toothing 27, and subsequently, a more gentle establishment of the rotational position of the tool holder 33.

While one advantageous embodiment has been chosen to illustrate the invention, it will be understood by those skilled in the art that various changes and modifications can be made therein without departing from the scope of the invention as defined in the appended claims.

What is claimed is:

1. A positionable tool holder for supporting a plurality of tools and means for selectively repositioning the tool holder for use in combination with a turning machine, comprising the combination of
  a fixed mounting member;
  a tool carrier rotatable about a fixed axis relative to said mounting member;
  means for releasably interconnecting said carrier and said mounting member, said means including
    a plurality of teeth on said tool carrier, and
    a toothed locking ring axially movable between a locking position in which the teeth on said ring engage the teeth on said carrier and an unlocked position in which the said teeth are disengaged;
  an actuating member mounted for engagement with said locking ring, each of said actuating member and said locking ring having means defining axially extending cam surfaces facing each other, said cam surfaces each including means for defining an axially sloping plane, an axially recessed seat and a driving shoulder;
  spring means for urging the cam surfaces of said actuating member and said locking ring into engagement;
  means for selectively coupling said carrier to said mounting member to prevent rotation thereof, said means including a movable bolt; and
  a reversible rotary drive motor supported on said mounting member, said drive motor and said means for coupling being energizable together, when said drive motor is driven in a direction reverse to the direction of rotation of the tool carrier.

2. An apparatus according to claim 1, wherein said bolt is movable transversely relative to said axis, said means for coupling further including a pivotable lever for operating said bolt and an electromagnet including an axially movable core and an energizing winding wherein movement of said core pivots said lever.

3. An apparatus according to claim 2 wherein said bolt is disposed within said tool carrier and is moved radially outwardly to engage said carrier.

4. An apparatus according to claim 1 wherein each of said cam surfaces include, sequentially, a driving shoulder, a recess for receiving a cam on the operating member, and first and second inclined surfaces, said first inclined surface having a greater slope than said second inclined surface relative to a plane perpendicular to said axis.

* * * * *